April 1, 1924. 1,488,935
H. J. MURRAY
SPEEDOMETER DRIVE
Filed April 17, 1922  2 Sheets-Sheet 1

INVENTOR
Howard J. Murray
BY
Warren S. Orton.
ATTORNEY

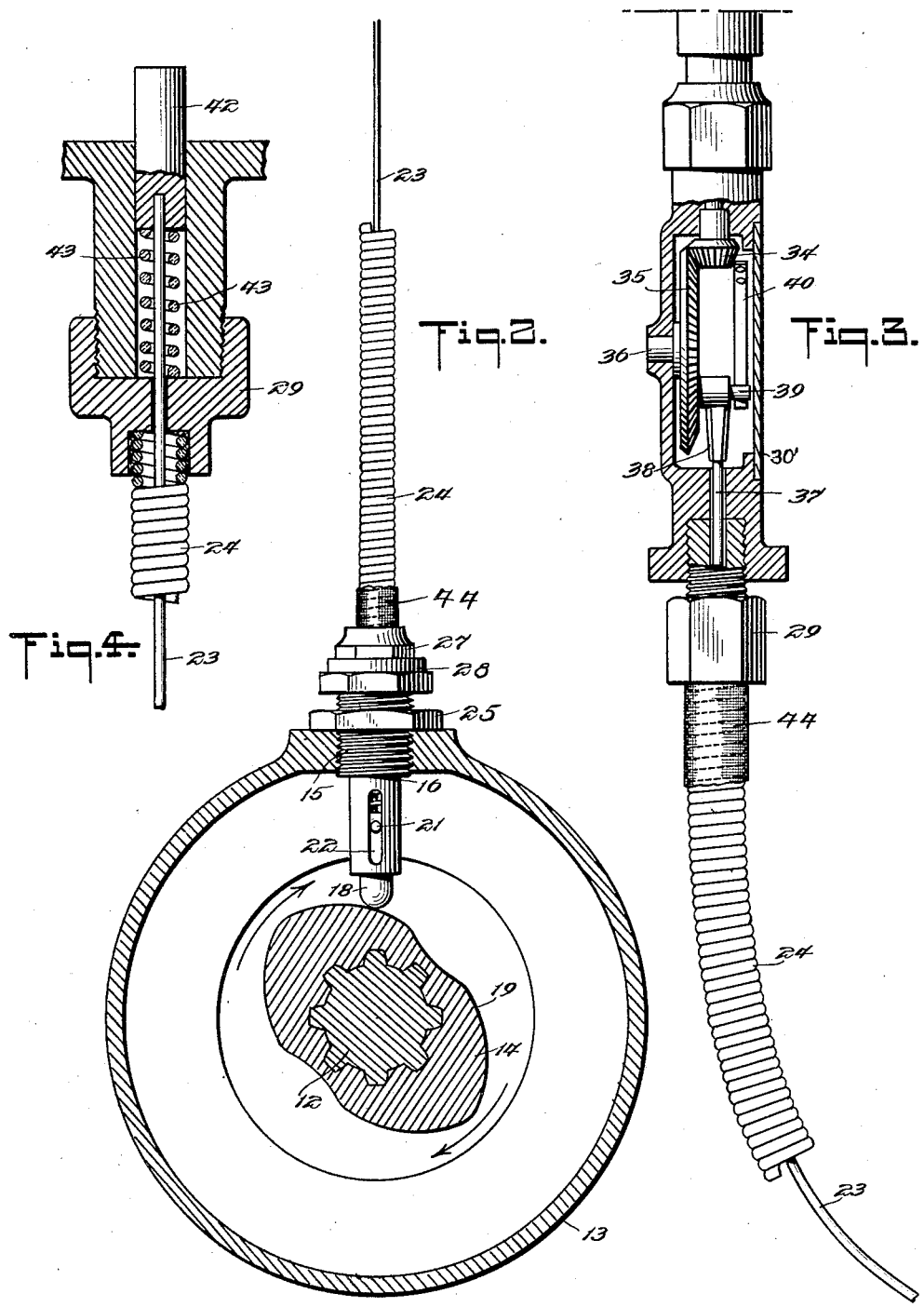

Patented Apr. 1, 1924.

1,488,935

UNITED STATES PATENT OFFICE.

HOWARD J. MURRAY, OF NEW YORK, N. Y.

SPEEDOMETER DRIVE.

Application filed April 17, 1922. Serial No. 553,379.

*To all whom it may concern:*

Be it known that I, HOWARD J. MURRAY, a citizen of the United States, and resident of New York city, in the county of Kings and State of New York, have invented certain new and useful Improvements in Speedometer Drives, of which the following is a specification.

The invention relates in general to a flexible power transmitting shafting of the type in which the power is transmitted by reciprocatory motion and the invention specifically relates to a drive for actuating an instrument, such as a speedometer, from a rotating power shaft, such as a transmission shaft, a function of which is to be indicated by the instrument.

In speedometer drives now in general use in automotive vehicle equipment it is an approved practice to mount the speedometer on the spring supported vehicle body and to make connection with one of the transmission shafts usually with the part of the driven shaft which extends out of the transmission housing. This type of drive necessitates the use of some form of flexible driving connection so that the speedometer is free to move bodily relative to the transmission shaft. The forms of speedometers now in general use include a main rotating drive shaft and the flexible connection between the speedometer shaft and the transmission shaft includes a rotating shaft element having geared connections at one end with the transmission shaft and using a direct driving connection at the opposite end with the speedometer shaft.

This rotating form of drive has numerous objections when considered in its practical operation. For instance, the public has not been educated to lubricate the speedometer nor its drive. As the result of this lack of lubrication, and also due to the fact that when lubricated, the oil leaked from the rotatable flexible shaft, it not infrequently happens that some part of the driving connection becomes stuck. This sticking becomes particularly noticeable when the drive has been inactive for sometime and further the parts are apt to rust in place. Under these conditions as soon as the power transmission shaft is caused to rotate it tears some part of the drive, strips the gears, twists the shafting and frequently causes an irregular actuation of the instrument.

Further the rotating type of flexible drive manifests a tendency to wear in the vicinity of sharp bends, and unless extreme care is taken in the machining of the intermeshing gears, an irregularity in action and excessive wear is apt to occur at the geared connections. Further changes in temperature cause a contraction and expansion which thus vary the location of moving parts and this shifting of parts becomes objectionable especially in the case of meshing gears.

The primary object of the present invention is to provide a simple, easily manufactured, and therefore inexpensive form of instrument drive which when applied to use as a speedometer drive will avoid the objections inherent in the use of the present form of rotating flexible shafting and at the same time retain its advantages.

Another object of the invention is to provide a self-lubricating speedometer drive which can function to carry lubricant from the transmission casing or other available source of supply through the drive to the speedometer without necessarily providing parts particularly intended for this purpose.

Another object of the invention is to provide a single, complete unitary article of manufacture which can be designed and sold for installation on transmission casings of the standard approved form and which is designed to drive not only the different forms of speedometers employing a rotating shaft but which will also drive a speedometer of the type which is actuated by a reciprocatory member, one form of which speedometer is described in my co-pending application, entitled Electric speedometers, filed June 20, 1922, Serial No. 569,759, and another form of which is described in my copending application Serial No. 569,760 filed June 20, 1922.

Various other objects and advantages of the invention will be in part obvious from an inspection of the accompanying drawings and in part will be more fully set forth in the following particular description of one form of mechanism embodying my invention, and the invention also consists in certain novel features of construction and combination of parts hereinafter set forth and claimed.

In the following particular description, the invention will be disclosed in connection with a conventional form of speedometer of the rotating shaft type so as to illustrate the adaptability of the disclosure to drive any of the usual forms of instruments which employ a rotating shaft, but it is to be understood that the disclosure, with obvious mechanical changes, can be adopted to drive other forms of instruments, and in Figure 4 there is disclosed the suggestion of connecting the drive to a reciprocating member rather than to the rotating shaft, common in the present forms of speedometers. Further, the invention is shown in connection with a supplemental housing on the transmission casing of an automotive vehicle power plant to illustrate the adaptability of the disclosure to present approved structures, but it is to be understood that the drive may receive power from any rotating power member and, with obvious changes, from any reciprocating power member.

In the accompanying drawings:

Figure 2 is an enlarged vertical sectional view taken on the line 2—2 of Figure 1;

Figure 3 is a similar view taken on the line 3—3 of Figure 1; and

Figure 4 is a detailed axial sectional view of a modified form of connection between the flexible drive disclosed in the other figures and a form of speedometer which employs a reciprocatory actuating member.

Figure 1:
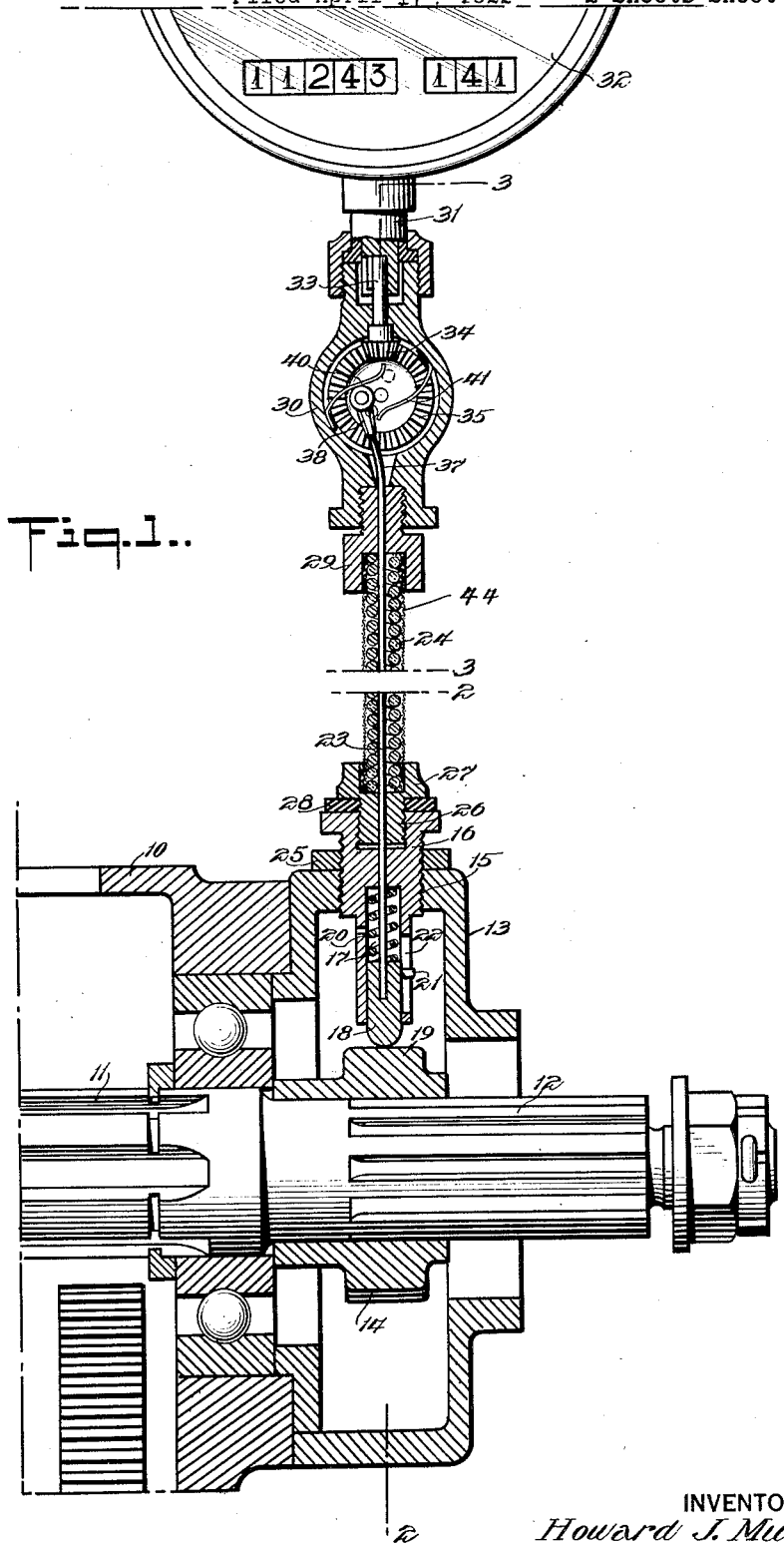
Figure 1 is a fragmentary sectional view of a part of an automobile transmission casing and part of a rotating shaft driven speedometer with a preferred embodiment of my invention constituting the drive therebetween.

In the drawings and referring particularly to Figure 1 there is shown a change gear containing transmission casing 10 from which projects the usual propeller shaft 11. Surrounding the projecting end 12 of the shaft is a supplemental housing 13 which will be referred to hereinafter collectively with the housing 10 simply as a transmission housing. In the present disclosure a cam 14 is keyed to the projecting portion 12 of the shaft within the housing 13. The housing is provided with a laterally extending screw threaded opening 15. It is to be understood that the construction, as thus far described, except that a gear is used in place of the cam 14 and a shaft carrying bushing is threaded into the opening 14, constitutes a conventional form of construction for accommodating one end of the speedometer drive now in general use.

Instead of the usual sleeve a bushing 16 is threaded into the opening 15, which bushing has a bore extending axially therethrough. The inner portion of the bore is enlarged to form a spring housing and plunger guideway 17. A round ended cam plunger 18 is mounted in the guideway 17 for reciprocatory movement and is maintained in bearing engagement with the face 19 of the cam 14 by means of a spring 20 disposed in the guideway back of the plunger 18. A pin 21 projecting laterally from the plunger works in a slot 22 formed in the bushing to prevent rotary movement of the plunger. This pin and slot connection can be omitted in those cases where the plunger is non-circular in cross-section or where slight rotary movement is unobjectionable, but even then it is of value to prevent plunger 18 from dropping out when cam 14 is removed.

The plunger is secured to one end of a flexible power transmitting wire or rod 23 which extends through the bushing 16 and is maintained out of contact with the walls of the guideway 17 by means of the spring 20. It will be understood from this construction that the spring will store energy when compressed which energy is used to pull the rod in its return movement. It is obviously within the scope of this disclosure to position another spring, preferably a weaker spring, at the opposite or speedometer end of the rod 23 and in the manner suggested by the disclosure in Figure 4. In this case the rod would no longer be a "push and pull" but a "pull and pull" rod. With springs at opposite ends the rod would only have to be guided at different points to change its direction as desired and would not require the flexible guide 24 hereinafter more fully described.

The bushing 16 is adopted to be adjusted relative to the cam by screwing the same in the opening 15 and when so adjusted is locked in position by means of a nut 25. The outer end of the bore through the bushing is enlarged to receive the downwardly projecting hub portion 26 of an adjusting nut 27 screwed into the same. A washer 28 is positioned between the nut and bushing to provide a tight connection and to prevent any possible leakage through the bushing.

The nut 27 has connected thereto one end of the flexible guide or covering 24 which encircles the exterior portion of the flexible rod 23. The flexible guide is simply a coiled wire with the turns in contact and of a size and strength to prevent kinking of the flexible rod in its reciprocatory movement while permitting a flexing of the same.

The opposite or speedometer end of the guide 24 is similarly secured in an adjusting bushing 29 through which extends the opposite end of the rod 23.

In the showing in Figure 1 the bushing 29 is screwed into a mechanism containing casing 30, hereinafter called an adopter due to the fact that it provides a driving connection which can be adopted to different driving shafts, such for instance, as the shaft 31 of a conventional form of instrument 32, such as the shaft driven speedometer partially shown in Figure 1. The connection with the shaft 31 is made by means of a tang 33 journalled in the end of the casing 30 opposite the end into which the bushing 29 is screwed. The tang 33 constitutes a pinion shaft and is provided on its inner end with a bevel pinion 34 which meshes with a bevel gear 35 carried by a stub shaft 36 journalled in the housing 30, as shown in Fig. 3. The gear 35 is driven in a clockwise direction from the rod 23 which leads into the casing 30 through a flat V-slot 37 which slot acts to maintain the rod in a plane parallel to the face of the gear 35. The rod is connected eccentrically to the gear 35 by means of a crank 38 pivotally connected to a pin 39 extending from the gear 35 as shown more particularly in Figure 3. Flat leaf springs 40 and 41 are disposed on opposite sides of the axis of the gear 35; are fastened at one end to the casing 30 and have their free ends disposed in the path of movement of the pin 39. By this construction it will be appreciated that the gear 35 will not only be carried over a "dead center" but will always rotate in the same direction.

This form of mechanism for converting reciprocatory into rotary motion has been selected for illustration because it gives uniform rotary movement which is necessary in driving speedometers of the magnetic or blast type. In the case of speedometers of the centrifugal governor type the same necessity for exact uniform rotary movement does not exist.

It is to be understood therefore that the means illustrated for translating the reciprocatory movement of the rod 23 into the rotary movement of the speedometer drive shaft is merely suggestive of one approved means for effecting this translation and any well known form of direction translating mechanism may be substituted for the form illustrated.

It is within the scope of this disclosure to vary the gear ratio of pinion 34 and gear 35 so as to drive the speedometer at different speeds and in order to permit ready access to the casing 30 it is opened at one side, as shown in Figure 3, which opening is designed to be covered by a lubricant tight closure 30¹.

In the modified showing in Figure 4 the reciprocating power transmitting rod 23 is connected directly to an instrument actuating member in the form of a plunger 42 which is mounted for reciprocatory movement in a guiding member 43 forming part of the instrument casing. This guiding member provides a housing for a spring 43 which bears at one end against the plunger 42 and at the other end against the bushing 29. The spring acts to project the plunger 42 upwardly in the showing in Fig. 4 so as to pull on the rod 23 as previously suggested. Here again the spring acts in a manner similar to the guide 24 to maintain the rod in substantially a straight line.

While reference has been made herein specifically to a speedometer drive it is obviously within the scope of the invention to drive odometers and other forms of instruments for indicating some function of rotation of the propeller shaft. While a two-throw form of cam 14 is disclosed in Figure 2 it is appreciated that the number of throws of the cam will be varied dependent upon the rate of reciprocation at which it is desired to drive the rod 23. Preferably the face of the cam should be designed to give a uniform constant motion to the gear 35.

As both the rod 23 and its guide 24 may be made of the same material the effect of expansion by heat is eliminated. However, even if they should expand the length of the connection would increase at the same rate and the extent of reciprocation would not be effected. Hence, heat expansion will have no effect on the push and pull rod.

It is the usual practice at present to supply the supplemental casing 13 with the lubricant from the main casing 10 and in this way the cam 14 is at all times embedded in lubricant. With the present disclosure mounted in place the plunger 17 and the part of the rod 22 will likewise be disposed in the lubricant. As the rod reciprocates it will slowly carry the lubricant out of the casing with a step-by-step motion and shift the lubricant along the rod into the space between the rod and its guide; through the casing 30 and eventually into the speedometer itself.

It is further suggested that the guide be inclosed within an oil-proof flexible covering 44, preferably a water-proof woven fabric. The disclosure thus constitutes a self-lubricating drive and with the parts thus lubricated the possibility of stripping gears and excessive wear is eliminated.

While I have shown and described and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination with a transmission shaft of an automotive vehicle, and a speedometer including a main driving shaft, said transmission shaft and said speedometer being capable of relative bodily movement to and from each other, of a flexible driving connection between the transmission shaft and the speedometer shaft, said connection including a cam fixed to the transmission shaft, a cam plunger engaging the cam and reciprocated thereby, a guided flexible rod attached at one end to and reciprocated by the plunger and means at the opposite end of the flexible rod for translating the reciprocatory movement of the rod into rotary movement of the speedometer shaft.

2. A speedometer drive including a bushing provided with means for mounting the same in a transmission casing, a cam controlled plunger mounted in the bushing for reciprocatory movement and adapted to be actuated by a shaft in the transmission casing, a spring housed in the bushing and bearing on the plunger, a second bushing, a flexible guide secured at opposite ends to said bushings, a power transmitting rod extending through the flexible guide into the bushings and secured at one end to the plunger to be reciprocated thereby and means at the other end for operatively connecting the reciprocating rod to a speedometer to actuate the same.

3. In a device of the class described, the combination with a casing having a power shaft mounted therein for rotary movement and a cam fixed to the part of the shaft within the casing, a bushing fitted to intrude into said casing, a spring controlled cam plunger guided for reciprocatory movement in said bushing and disposed in operative engagement with said cam to be reciprocated thereby in its rotary movement, a rod mounted for reciprocatory movement and attached at one end to said plunger to be actuated thereby, an instrument positioned exteriorly of the casing for indicating a function of the movement of said shaft and connecting means at the other end of the rod for causing its reciprocatory movement to actuate said instrument.

4. In an automotive vehicle, the combination of a casing, a transmission shaft journalled in the casing, an instrument for indicating a function of the movement of the shaft, said casing and instrument capable of relative bodily movement, a flexible driving connection between the shaft and said instrument permitting said relative movement between the casing and instrument, said connection including a flexible rod having a freedom of movement both longitudinally and transversely, and means within the casing for preventing rotary movement of the rod.

5. In a power transmission, the combination with a driving member and a driven member both mounted for rotary movement and adapted for relative bodily movement, of a flexible driving connection therebetween, said connection including a flexible reciprocating rod, means at one end of the connection for translating the rotary movement of the driving member into reciprocatory movement of the rod and means at the other end of the connection for translating the reciprocatory movement of the rod into the rotary movement of the driven member and means for guiding said rod in all positions of the same.

6. In a power transmission, the combination with a driving member and a driven member both mounted for rotary movement, of a flexible driving connection therebetween, said connection including a flexible reciprocating rod, means at one end of the connection for translating the rotary movement of the driving member into reciprocatory movement of the rod and means at the other end of the connection for translating the reciprocatory movement of the rod into the rotary movement of the driven member.

7. In a power transmission, the combination with a rotary driving member and a driven member, of a flexible driving connection therebetween, said connection including a power transmitting member, capable of reciprocatory movement in the direction of its length, a flexible tubular member enclosing a part of the flexible power transmitting member for guiding the same in its reciprocatory movement and means at one end of the connection for translating the rotary movement of the driving member into the reciprocatory movement of the flexible power transmitting member.

8. In an instrument drive, the combination of a flexible rod constituting a power transmitting member, a flexible guide enclosing a part of the rod, means at one end of the rod for reciprocating the same and means at the opposite end for causing the reciprocatory movement of the rod to actuate an instrument.

9. In an instrument drive, the combination of a single, flexible power transmitting member mounted for reciprocatory movement a flexible guide for the member extending lengthwise thereof, means at one end of the member for moving the same in one of its reciprocatory directions and means at the opposite end adapted to be connected to an instrument for actuating the same.

10. In an instrument drive, the combination of a drive including a flexible power transmitting rod movable in the direction of its length and provided with means for operatively connecting the same to an instrument to actuate the same and direction changing means for operatively connecting the rod to a rotating power member, a function of which is to be indicated by the instrument and a tubular member enclosing the rod and acting to prevent the same from kinking.

11. A speedometer drive constituting a connection between the transmission of an automotive vehicle and a speedometer, said drive including a plunger and means for actuating the same from a transmission shaft, a mounting for the plunger adapted to be installed in the transmission casing, a flexible reciprocating rod actuated by the plunger and an adaptor for connecting the reciprocating rod in operative relation to a speedometer to drive the same, said connection constituting a complete unit adapted for connecting the transmission shaft with different forms of speedometers.

12. In a self lubricating instrument drive, the combination of a casing adapted to contain a lubricant, a rotating member mounted in said casing, an instrument positioned exteriorly of the casing for indicating a function of said rotating member, a driving connection between said member and the instrument, said connection including a reciprocating member terminating at one end in said casing and adapted to receive lubricant at said end, said reciprocating member acting on the lubricant to feed the same with a step-by-step movement to the instrument.

13. In a self-lubricating speedometer drive, the combination of a flexible power transmitting rod, a casing for the same, means at one end for connecting the same to a speedometer, means at the other end for lubricating the rod, said rod in its reciprocatory movement acting to feed the lubricant with a step-by-step movement in the space between the rod and its casing.

14. In a self-lubricating speedometer drive, the combination of a power transmitting member including means for causing a constant feed of lubricant along the power transmitting member towards the end designed to be attached to the speedometer.

15. In a speedometer drive, the combination of an adaptor, a rod leading into the same and guided therein for reciprocatory movement, a gear, a crank connection between the crank and the gear, means for causing the gear to turn in one direction and means for connecting the gear to a speedometer to drive the same.

16. In a speedometer drive, the combination of a casing, mechanism housed therein for translating one form of motion into another form, power transmitting means mounted in the casing for reciprocatory motion and operatively connected to said mechanism and means controlled by the reciprocation of said means for driving a speedometer.

17. In a speedometer drive, the combination of a reciprocating flexible power transmitting rod, a flexible guide for the same, a spring acting on the rod and tending to move the same in one direction and a speedometer actuating coupling means for connecting the rod with a speedometer.

18. In a speedometer drive, the combination of a casing, a plug intruded through the side of the casing and constituting a piston cylinder, a plunger slidably mounted therein, means for preventing rotation of the plunger in the casing, a flexible rod extending axially through the cylinder and disposed in spaced relation to the wall of the cylinder and projecting exteriorly of the casing, a coiled spring guided on the part of the flexible rod within the casing, bearing on the plunger to move the same in one direction, said spring being in spaced relation to the wall of the cylinder and acting on the flexible rod to prevent the same from kinking or bending into contact with the cylinder wall.

19. In a device of the class described, the combination of a power transmitting rod mounted for reciprocatory movement and adapted to feed a lubricant along the same with a step-by-step movement, a flexible guide for the same, and a lubricant-proof flexible covering for the guide.

20. In a device of the class described, the combination of a power transmitting rod mounted for reciprocatory movement and adapted to feed a lubricant along the same with a step-by-step movement, and a lubricant-proof flexible covering for the rod.

Signed at New York city, in the county of New York and State of New York, this 12th day of April A. D. 1922.

HOWARD J. MURRAY.